(12) United States Patent
Kim et al.

(10) Patent No.: US 8,451,410 B2
(45) Date of Patent: May 28, 2013

(54) ARRAY SUBSTRATE FOR WIDE VIEWING ANGLE LIQUID CRYSTAL DISPLAY DEVICE AND MEHOD OF MANUFACTURING THE SAME

(75) Inventors: Jeong-Oh Kim, Seoul (KR); Jong-Won Moon, Paju-si (KR); Jung-Il Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 113 days.

(21) Appl. No.: 13/167,523

(22) Filed: Jun. 23, 2011

(65) Prior Publication Data
US 2011/0317117 A1    Dec. 29, 2011

(30) Foreign Application Priority Data

Jun. 24, 2010  (KR) ......................... 10-2010-0059886

(51) Int. Cl.
*G02F 1/1343*    (2006.01)
(52) U.S. Cl.
USPC ............................ 349/139; 349/143; 349/146
(58) Field of Classification Search
None
See application file for complete search history.

(56) References Cited

U.S. PATENT DOCUMENTS

| | | | |
|---|---|---|---|
| 2002/0140691 A1* | 10/2002 | Sato et al. | 345/212 |
| 2003/0081164 A1* | 5/2003 | Sato et al. | 349/141 |
| 2007/0153198 A1* | 7/2007 | Cho et al. | 349/141 |
| 2009/0160748 A1* | 6/2009 | Kimura et al. | 345/94 |
| 2010/0296040 A1* | 11/2010 | Han et al. | 349/139 |

* cited by examiner

*Primary Examiner* — Mike Stahl
(74) *Attorney, Agent, or Firm* — McKenna Long & Aldridge, LLP

(57) ABSTRACT

An array substrate for a wide viewing angle liquid crystal display device includes a gate line on a substrate, a data line crossing the gate line to define a pixel region, a thin film transistor electrically connected to the gate and data lines, a pixel electrode in the pixel region and connected to a drain electrode of the thin film transistor, the pixel electrode including two parts and an opening portion therebetween, a first common electrode in the opening portion, the first common electrode disposed on a same layer as the pixel electrode, a passivation layer on the pixel electrode and the first common electrode, the passivation layer having a common contact hole exposing the first common electrode, and a second common electrode on the passivation layer and connected to the first common electrode through the common contact hole, the second common electrode including first openings corresponding to the pixel electrode and a second opening corresponding to the opening portion.

12 Claims, 5 Drawing Sheets

ARRAY SUBSTRATE FOR WIDE VIEWING ANGLE LIQUID CRYSTAL DISPLAY DEVICE AND MEHOD OF MANUFACTURING THE SAME

This application claims the benefit of Korean Patent Application No. 10-2010-0059886 filed in Korea on Jun. 24, 2010, which is hereby incorporated by reference for all purposes as if fully set forth herein.

BACKGROUND OF THE INVENTION

1. Field of the Invention

The invention relates to a liquid crystal display device, and more particularly, to an array substrate for a wide viewing angle liquid crystal display (LCD) device and a method of manufacturing the same.

2. Discussion of the Related Art

Liquid crystal display (LCD) devices are driven based on optical anisotropy and polarization characteristics of a liquid crystal material. The LCD devices have been widely used for display units of portable electronic devices, monitors of personal computers, or televisions. Liquid crystal molecules have a long and thin shape, and the liquid crystal molecules are regularly arranged along in an alignment direction. Light passes through the LCD device along the long and thin shape of the liquid crystal molecules. The alignment of the liquid crystal molecules depends on the intensity or the direction of an electric field applied to the liquid crystal molecules. By controlling the intensity or the direction of the electric field, the alignment of the liquid crystal molecules is controlled to display images.

Generally, an LCD device includes two substrates, which are spaced apart and facing each other, and a liquid crystal layer is interposed between the two substrates. Each of the substrates includes an electrode. The electrodes from respective substrates face one another. An electric field is induced between the electrodes by applying a voltage to each electrode. An alignment direction of liquid crystal molecules changes in accordance with a variation in the intensity or the direction of the electric field.

However, since the LCD device uses a vertical electric field that is perpendicular to the substrates, the LCD device has poor viewing angles.

To resolve the poor viewing angles, an in-plane switching (IPS) mode liquid crystal display (LCD) device has been suggested.

In an IPS mode LCD device, a pixel electrode and a common electrode are alternately disposed on the same substrate, and a horizontal electric field that is parallel to the substrate is induced between the pixel electrode and the common electrode. Liquid crystal molecules are driven by the horizontal electric field and move parallel to the substrate. Accordingly, the IPS mode LCD device has the improved viewing angles.

However, the IPS mode LCD device has disadvantages of low aperture ratio and transmittance. To solve the disadvantages of the IPS mode LCD device, a fringe field switching (FFS) mode LCD device has been suggested.

FIG. 1 is a plan view of a pixel region of an array substrate for a related art FFS mode LCD device.

In FIG. 1, a gate line 43 is formed along a direction, and a data line 51 crosses the gate line 43 to define a pixel region P. A thin film transistor Tr is formed at the pixel region P and is connected to the gate line 43 and the data line 51. The thin film transistor Tr includes a gate electrode 45, a semiconductor layer 46 of an active layer 46a and ohmic contact layers 46b, a source electrode 55, and a drain electrode 58.

A pixel electrode 60 is formed at the pixel region P and is connected to the drain electrode 58 of the thin film transistor Tr. The pixel electrode 60 corresponds to substantially the whole pixel region P and has a rectangular plate shape.

A common electrode 75 is formed over the pixel electrode 60 with a passivation layer 60 interposed therebetweeen. The common electrode 75 includes openings oa in the pixel region P. The common electrode 75 extends into a next pixel region adjacent to the pixel region P and corresponds to substantially all over a display area including a plurality of pixel regions P. The openings oa have a bar shape and are parallel to the data line 51.

FIG. 2 is a cross-sectional view of a pixel region of an array substrate for a related art FFS mode LCD device. FIG. 2 corresponds to a cross-section taken along the line II-II of FIG. 1.

In FIG. 2, a gate electrode 45 and a gate line (not shown) are formed on a substrate 50. A gate insulating layer 30 covers the gate electrode 45 and the gate line. An active layer 46a is formed on the gate insulating layer 30 corresponding to the gate electrode 45, and ohmic contact layers 46b are formed on the active layer 46a and spaced apart from each other.

Source and drain electrodes 55 and 58 are formed on the ohmic contact layers 46b and spaced apart from each other.

A data line 51 is formed on the gate insulating layer 30 and crosses the gate line to define a pixel region P. A pixel electrode 60 is formed at the pixel region P and contacts an end of the drain electrode 58.

A passivation layer 70 is formed on the pixel electrode 60, and a common electrode 75 is formed on the passivation layer 70. The common electrode 75 is formed substantially all over a display area. The common electrode 75 includes openings oa corresponding to the pixel electrode 60. The common electrode 75 and the pixel electrode 60 overlap each other to form a storage capacitor.

In the array substrate for the related art FFS mode LCD device having the above-mentioned structure, when a voltage is applied to the pixel electrode 60 and the common electrode 75, a fringe field is induced between the pixel electrode 60 and the common electrode 75 overlapping each other. Therefore, even liquid crystal molecules over the electrodes are driven by the fringe field, and the FFS mode LCD device has a transmittance and an aperture ratio higher than the IPS mode LCD device.

By the way, in the FFS mode LCD device, the storage capacitor, which is formed by the pixel electrode 60 and the common electrode 75, is formed all over the pixel region P. Thus, the storage capacitor has three to five times as large capacitance as that of the IPS mode LCD device. If the storage capacitor has too large capacitance, it is hard to charge the storage capacitor in a high definition model or in a high frequency model.

To solve the problem, the width of the gate line 43 of FIG. 1 or the data line 51 should be increased to thereby decrease the resistance or the width of the channel of the thin film transistor Tr should be increased. However, this causes a decrease of the aperture ratio, and the transmittance and the brightness are lowered.

SUMMARY OF THE INVENTION

Accordingly, the present invention is directed to an array substrate for a fringe field switching mode liquid crystal display device and a method of manufacturing the same that substantially obviate one or more of the problems due to limitations and disadvantages of the related art.

An object of the present invention is to provide an array substrate for a fringe field switching mode liquid crystal display device and a method of manufacturing the same that decrease the capacitance of the storage capacitor to improve the charging property and increase the aperture ratio and the transmittance.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of embodiments of the invention, as embodied and broadly described, an array substrate for a wide viewing angle liquid crystal display device includes a gate line on a substrate, a data line crossing the gate line to define a pixel region, a thin film transistor electrically connected to the gate and data lines, a pixel electrode in the pixel region and connected to a drain electrode of the thin film transistor, the pixel electrode including two parts and an opening portion therebetween, a first common electrode in the opening portion, the first common electrode disposed on a same layer as the pixel electrode, a passivation layer on the pixel electrode and the first common electrode, the passivation layer having a common contact hole exposing the first common electrode, and a second common electrode on the passivation layer and connected to the first common electrode through the common contact hole, the second common electrode including first openings corresponding to the pixel electrode and a second opening corresponding to the opening portion.

In another aspect, a method of manufacturing an array substrate for a wide viewing angle liquid crystal display device includes forming a gate line on a substrate, forming a data line crossing the gate line to define a pixel region, forming a thin film transistor electrically connected to the gate and data lines, forming a pixel electrode in the pixel region and connected to a drain electrode of the thin film transistor, the pixel electrode including two parts and an opening portion therebetween, forming a first common electrode in the opening portion, the first common electrode disposed on a same layer as the pixel electrode, forming a passivation layer on the pixel electrode and the first common electrode, the passivation layer having a common contact hole exposing the first common electrode, and forming a second common electrode on the passivation layer and connected to the first common electrode through the common contact hole, the second common electrode including first openings corresponding to the pixel electrode and a second opening corresponding to the opening portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EXEMPLARY EMBODIMENTS

Reference will now be made in detail to an exemplary embodiment of the invention, which is illustrated in the accompanying drawings.

Figure 3:
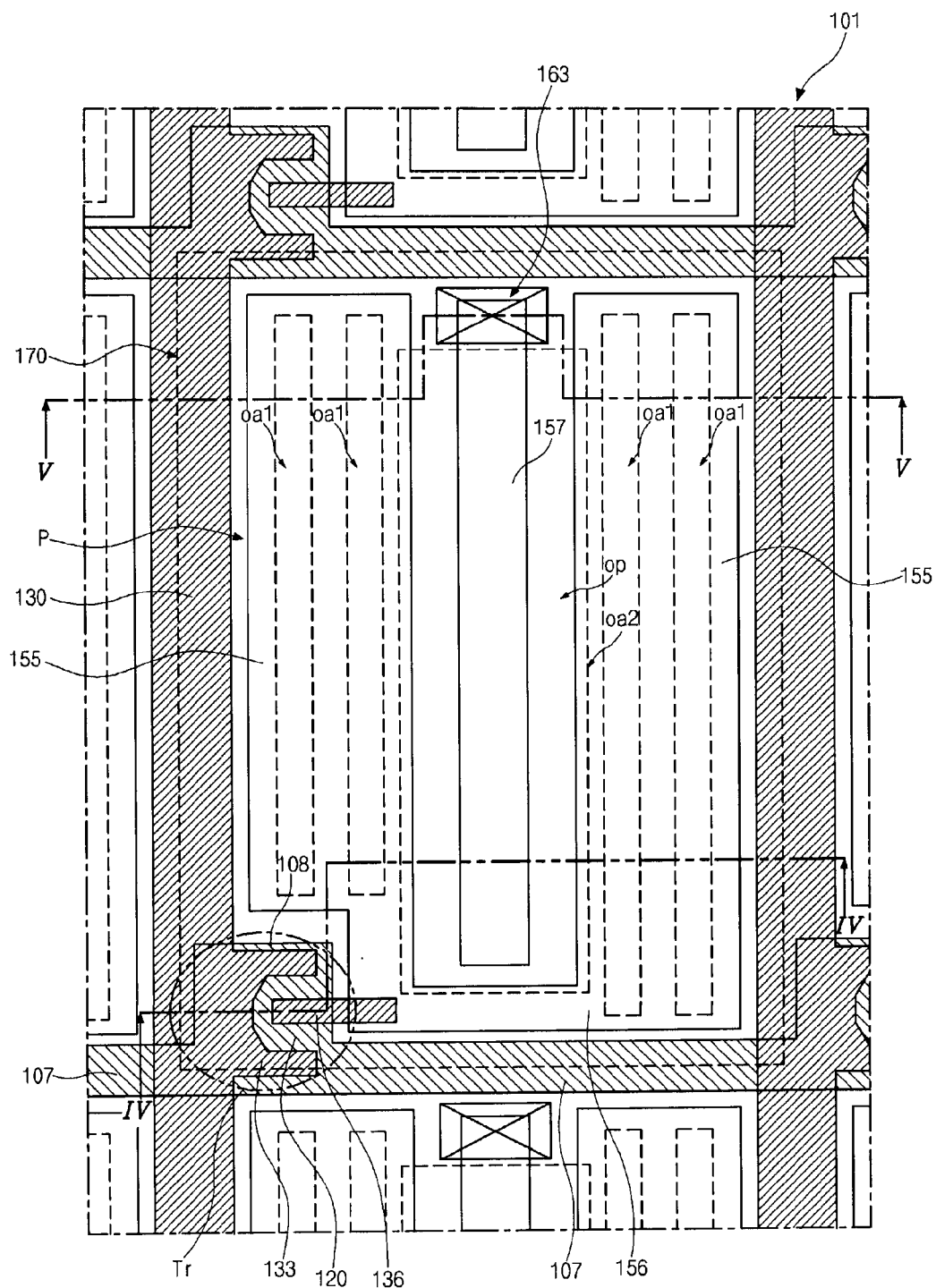
FIG. 3 is a plan view of one pixel region of an array substrate for an FFS mode LCD device according to an exemplary embodiment of the invention.

FIG. 3 is a plan view of one pixel region of an array substrate for a fringe field switching (FFS) mode liquid crystal display (LCD) device according to an exemplary embodiment of the invention. In FIG. 3, although a second common electrode is not explicitly shown because the second common electrode is formed on a substantially entire surface of a substrate, for convenience of the explanation, the second common electrode is indicated by a dash line along the boundary of a pixel region and designated by the reference 170.

In FIG. 3, a gate line 107 is formed along a first direction, and a data line 130 is formed along a second direction. The gate line 107 and the data line 130 cross each other with a gate insulating layer (not shown) interposed therebetween to define a pixel region P.

A thin film transistor Tr is formed at the pixel region P and is connected to the gate line 107 and the data line 130. The thin film transistor Tr includes a gate electrode 108, the gate insulating layer, a semiconductor layer (not shown) of an active layer (not shown) and ohmic contact layers (not shown), and source and drain electrodes 133 and 136 sequentially formed.

Here, the thin film transistor Tr has a U-like shape channel. The channel of the thin film transistor Tr varies depending on the shapes of the source and drain electrodes 133 and 136.

A pixel electrode 155 is formed in the pixel region P. The pixel electrode 155 is formed of a transparent conductive material and contacts the drain electrode 136 of the thin film transistor Tr. The pixel electrode 155 includes an opening portion op at a central portion of the pixel region P and two parts at both sides of the opening portion op. The two parts of the pixel electrode 155 each have a rectangular plate shape and are connected to each other through a pixel connecting pattern 156.

A first common electrode 157 is also formed in the pixel region P. The first common electrode 157 is formed of the same material on the same layer as the pixel electrode 155 and is disposed in the opening portion op of the pixel electrode 155. The first common electrode 157 has a straight bar shape.

A passivation layer (not shown) is formed on the pixel electrode 155 and the first common electrode 157. The passivation layer has a common contact hole 163 exposing one end of the first common electrode 157.

A second common electrode 170 is formed on the passivation layer. The second common electrode 170 contacts the first common electrode 157 through the common contact hole 163. The second common electrode 170 includes first openings oa1 and a second opening oa2. The first openings oa1 correspond to the two parts of the pixel electrode 155 and are spaced apart from each other to have a bar shape. The second opening oa2 corresponds to the opening portion op of the pixel electrode 155. The second opening oa2 has a wider width than the opening portion op, and both sides of the second opening oa2 overlap the two parts of the pixel electrode 155, respectively. The second opening oa2 minimize distortion of a horizontal electric field induced between the first common electrode 157 and the pixel electrode 155 and further strengthens a fringe field around sides of the pixel electrode 155 forming a border with the opening portion op.

The pixel electrode 155 and the second common electrode 170 overlapping each other form a storage capacitor with the passivation layer interposed between the electrodes 155 and 170.

In the array substrate for an FFS mode LCD device having the above-mentioned structure, the first common electrode 157 is formed on the same layer as the pixel electrode 155, and the horizontal electric field is induced between the pixel electrode 155 and the first common electrode 157 in the middle of the pixel region P. In addition, the second common electrode 170 having the first openings oa1 overlaps the pixel electrode 155, and the fringe field is induced between the pixel electrode 155 and the second common electrode 170.

Hereinafter, a cross-sectional structure of an array substrate for an FFS mode LCD device according to the invention will be described with reference to accompanying drawings.

Figure 4:
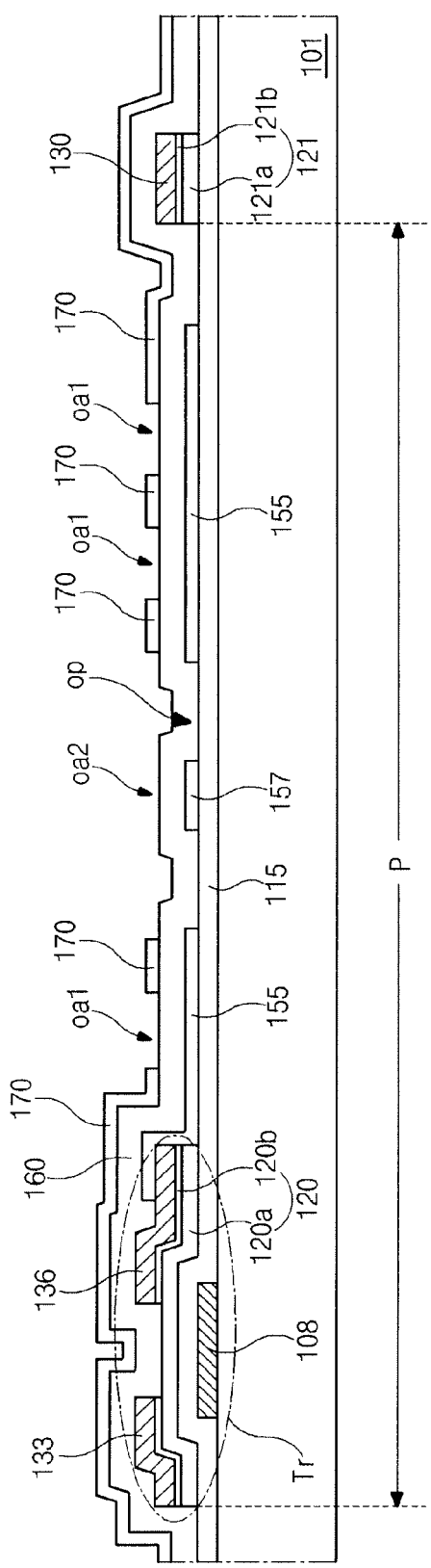
FIG. 4 is a cross-sectional view taken along the line IV-IV of FIG. 3.
Figure 5:
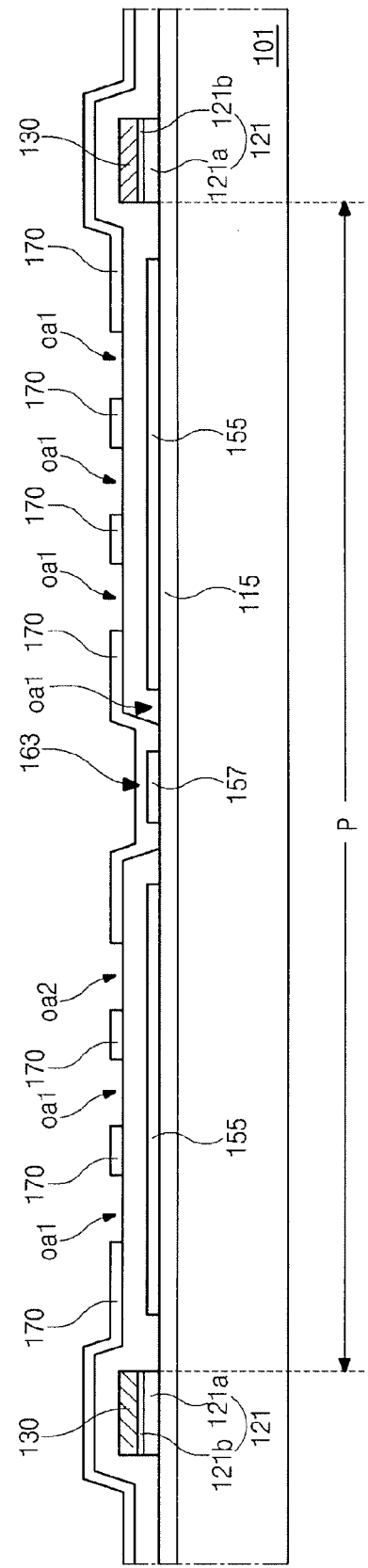
FIG. 5 is a cross-sectional view taken along the line V-V of FIG. 3.

FIG. 4 is a cross-sectional view taken along the line IV-IV of FIG. 3. FIG. 5 is a cross-sectional view taken along the line V-V of FIG. 3.

In FIG. 4 and FIG. 5, a gate electrode 108 is formed in a pixel region P on a transparent substrate 101. A gate line (not shown) is formed on the substrate 101 along a first direction and is connected to the gate electrode 108. The gate line and the gate electrode 108 may be formed of a metallic material having relatively low resistivity, for example, aluminum (Al), aluminum alloy such as aluminum neodymium (AlNd), copper (Cu), copper alloy, molybdenum (Mo), and molybdenum alloy such as molybdenum titanium (MoTi). The gate line and the gate electrode 108 may have a single-layered structure or a multi-layered structure.

Then, a gate insulating layer 115 is formed on a substantially entire surface of the substrate 101 including the gate line and the gate electrode 108. The gate insulating layer 115 may be formed by depositing an inorganic insulating material, for example, silicon oxide ($SiO_2$) or silicon nitride (SiNx).

A semiconductor layer 120 is formed on the gate insulating layer 115 corresponding to the gate electrode 108. The semiconductor layer 120 includes an active layer 120a of intrinsic amorphous silicon and ohmic contact layers 120b of impurity-doped amorphous silicon.

Source and drain electrodes 133 and 136 are formed on the semiconductor layer 120, more particularly, on the ohmic contact layers 120b and are spaced apart from each other to expose the active layer 120a. The gate electrode 108, the insulating layer 115, the semiconductor layer 120, and the source and drain electrodes 133 and 136 constitute a thin film transistor Tr.

A data line 130 is formed on the gate insulating layer 115 and crosses the gate line to define the pixel region P. The data line 130 is connected to the source electrode 133 of the thin film transistor Tr.

A semiconductor dummy pattern 121 is formed between the gate insulating layer 115 and the data line 130. The semiconductor dummy pattern 121 includes first and second patterns 121a and 121b of the same materials as the active layer 120a and the ohmic contact layers 120b, respectively. The semiconductor dummy pattern 121 may be formed due to the manufacturing processes and may be omitted.

Next, a pixel electrode 155 is formed in the pixel region P on the gate insulating layer 115. The pixel electrode 155 is formed of a transparent conductive material, for example, indium tin oxide (ITO) or indium zinc oxide (IZO). The pixel electrode 155 includes two parts and has an opening portion op corresponding to a central portion of the pixel region P between the two parts. Each of the two parts of the pixel electrode 155 has a rectangular shape, and one of the two parts of the pixel electrode 155, which is adjacent to the thin film transistor Tr, overlaps one end of the drain electrode of the thin film transistor Tr. The two parts of the pixel electrode 155 is connected to each other through a pixel connecting pattern 156, which is formed of the same material as the pixel electrode 155 and is one-united body with the pixel electrode 155.

In addition, a first common electrode 157 is formed in the pixel region P on the gate insulating layer 155 and corresponds to the opening portion op. The first common electrode 157 is disposed in the opening portion op between the two parts of the pixel electrode 155 and is spaced apart from the two parts of the pixel electrode 155 by the same distance. The first common electrode 157 is formed of the same material on the same layer as the pixel electrode 155 and the pixel connecting pattern 156.

A passivation layer 160 is formed on a substantially entire surface of the substrate 101 to cover the pixel electrode 155, the pixel connecting pattern 156, the first common electrode 157, the thin film transistor Tr and the data line 130. The passivation layer 160 is formed of an inorganic insulating material such as silicon oxide (SiO2) or silicon nitride (SiNx) or an organic insulating material such as benzocyclobutene (BCB) or photo acryl. The passivation layer 160 has a common contact hole 163 exposing the first common electrode 157 in the pixel region P.

A second common electrode 170 is formed on the passivation layer 160 and disposed on substantially all over a display area. The second common electrode 170 is formed of a transparent conductive material such as indium tin oxide (ITO) or indium zinc oxide (IZO). The second common electrode 170 contacts the first common electrode 157 through the common contact hole 163 in the pixel region P. The second common electrode 170 includes first openings oa1 and a second opening oa2. The first openings oa1 correspond to the pixel electrode 155 and have a bar shape. The second opening oa2 corresponds to the opening portion op of the pixel electrode 155 excluding a portion of the common contact hole 163.

Figure 1:
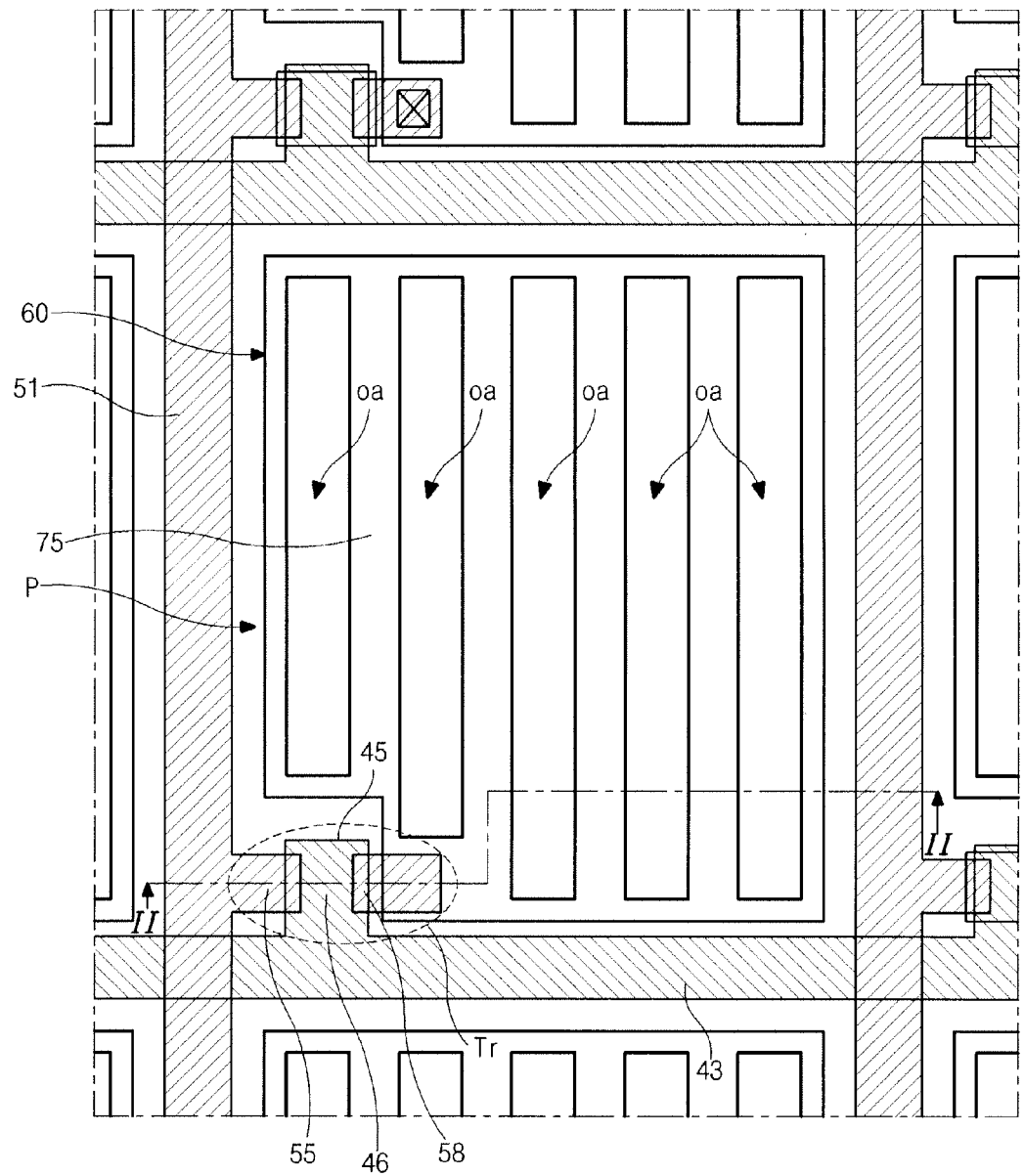
FIG. 1 is a plan view of a pixel region of an array substrate for a related art FFS mode LCD device.
Figure 2:
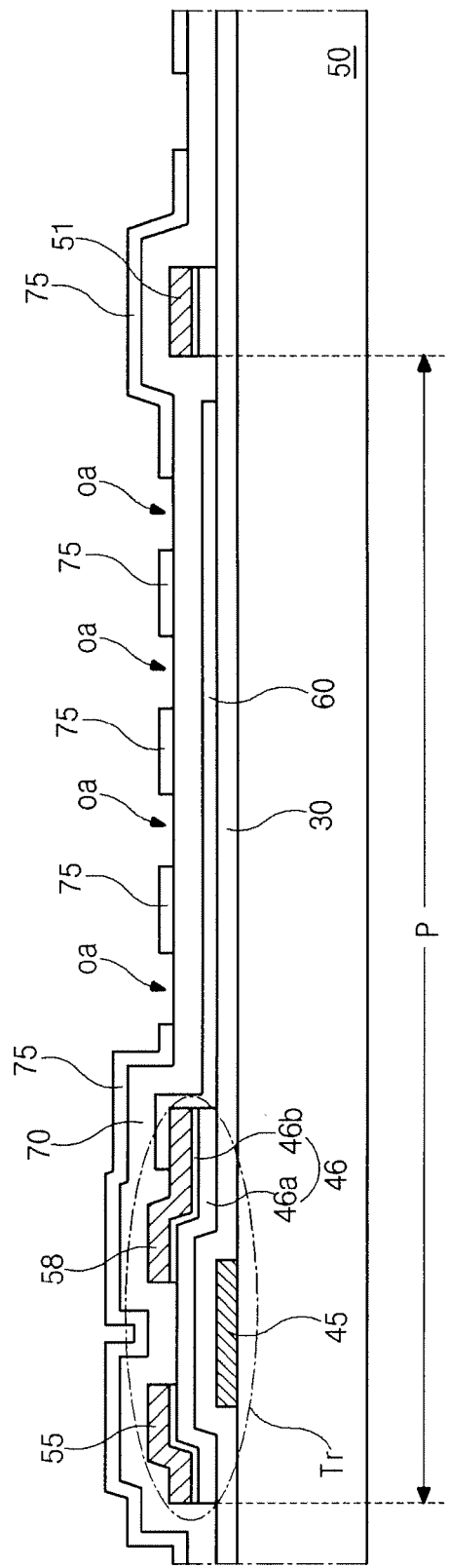
FIG. 2 is a cross-sectional view of a pixel region of an array substrate for a related art FFS mode LCD device.

In the array substrate for the FFS mode LCD device according to the invention, the overlapping area between the pixel electrode 155 and the second common electrode 170 is small as compared with the related art of FIG. 2, and the capacitance of the storage capacitor is decreased.

More particularly, in the array substrate for the FFS mode LCD device according to the invention, the pixel electrode 155 is removed to correspond to the central portion of the pixel region P and the opening portion op is formed between the two parts of the pixel electrode 155. The second common electrode 170 is also removed to correspond to the central portion of the pixel region P, and the second opening oa2 is formed. Therefore, there is no storage capacitor in the central portion of the pixel region P.

Accordingly, when it is assumed that the pixel region P is the same as that in the related art, the capacitance of the storage capacitance of the array substrate for the FFS mode LCD device according to the invention is decreased in comparison with the related art.

Furthermore, the first common electrode 157 is formed on the same layer through the same process as the pixel electrode 155 in the central portion of the pixel region P and is spaced apart from the pixel electrode 155. The changes in the capacitance of the storage capacitor and the transmittance, which may be caused due to a change of the overlapping area between the pixel electrode 155 and the common electrodes 157 and 170 when the electrodes 155, 157 and 170 are formed on different layers, are minimized.

Moreover, a horizontal electric field is induced between the pixel electrode 155 and the first common electrode 157 in the central portion of the pixel region P, and a fringe field is induced between the pixel electrode 155 and the second common electrode 170 in both sides of the pixel region P because the pixel electrode 155 overlaps the second common electrode 170 having the first openings oa1. Therefore, the horizontal electric field and the fringe field are complementary to each other, and variation of the transmittance is lowered.

Figure 6:
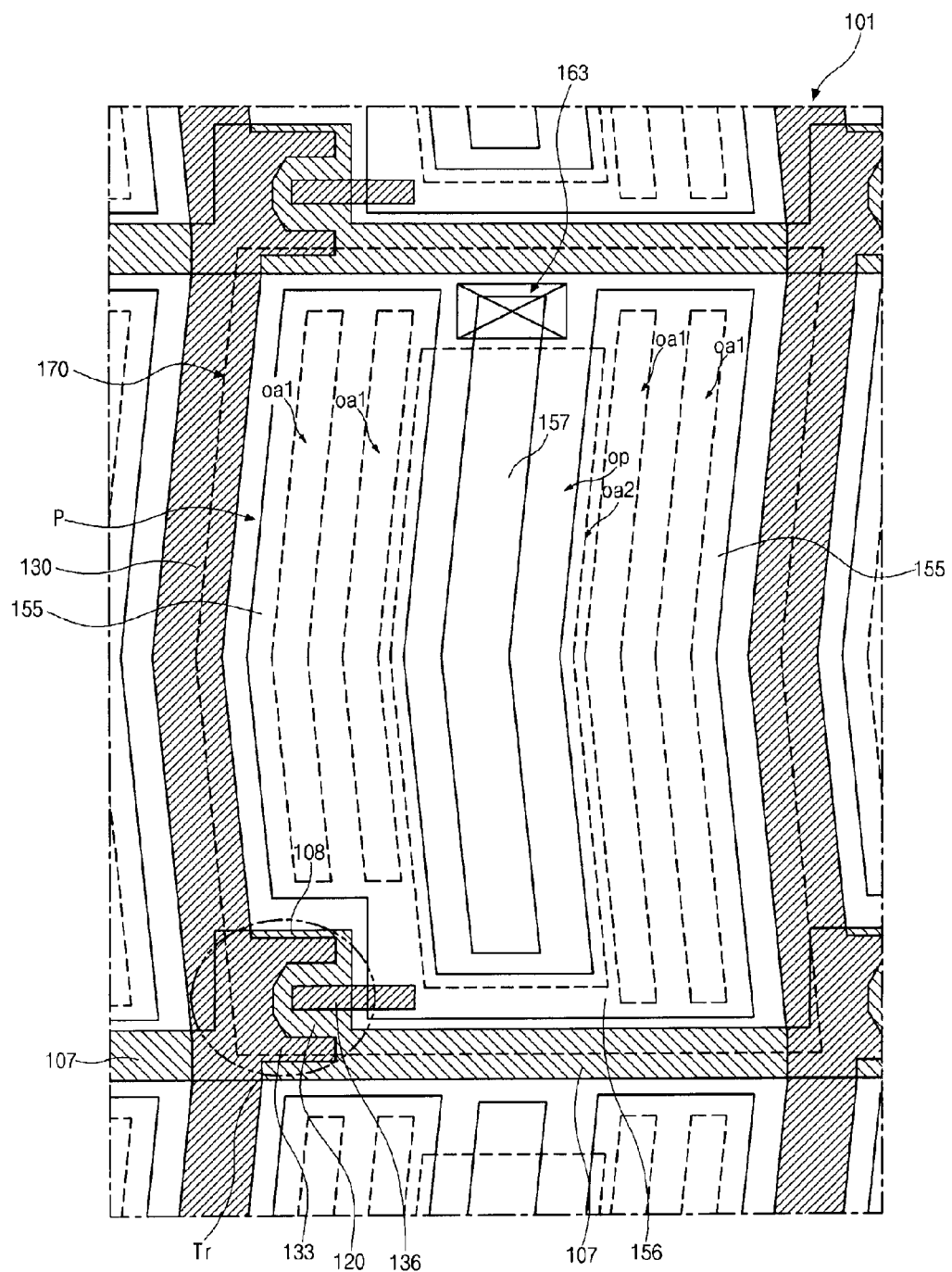
FIG. 6 is a plan view of one pixel region of an array substrate for an FFS mode LCD device according to another exemplary embodiment of the invention.

Meanwhile, in the array substrate for the FFS mode LCD device according to the invention, the first openings oa1 of the first common electrode 170, the pixel electrode 155 and the first common electrode 157 have the straight bar shape or the rectangular shape, for example. The first openings oa1 of the first common electrode 170, the pixel electrode 155 and the first common electrode 157, as shown in FIG. 6, may be bent and symmetric with respect to a supposed horizontal line parallel to the gate line 107 of FIG. 3 and crossing the central portion of the pixel region P. At this time, the data line 130 also may be bent corresponding to the central portion of the pixel region P to thereby form a zigzag shape in the display area of the device.

When the first openings oa1 of the first common electrode 170, the pixel electrode 155 and the first common electrode 157 has a bent structure with respect to the central portion of the pixel region P, the pixel region P has double domains, and the color shift depending on viewing angles is improved in the FFS mode LCD device.

In the FFS mode LCD device according to the invention, since the capacitance of the storage capacitor is decreased, the charging property of the storage capacitor is improved, and the aperture ratio and the transmittance are increased.

Moreover, the change in the overlapping areas between the pixel electrode and the common electrode is minimized due to the pixel electrode and the common electrode on the same layer, and the variation in the transmittance is minimized. This is applicable to a large-sized LCD device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An array substrate for a wide viewing angle liquid crystal display device, comprising:
   a gate line on a substrate;
   a data line crossing the gate line to define a pixel region;
   a thin film transistor electrically connected to the gate and data lines;
   a pixel electrode in the pixel region and connected to a drain electrode of the thin film transistor, the pixel electrode including two parts and an opening portion therebetween;
   a first common electrode in the opening portion, the first common electrode disposed on a same layer as the pixel electrode;
   a passivation layer on the pixel electrode and the first common electrode, the passivation layer having a common contact hole exposing the first common electrode; and
   a second common electrode on the passivation layer and connected to the first common electrode through the common contact hole, the second common electrode including first openings corresponding to the pixel electrode and a second opening corresponding to the opening portion.

2. The array substrate according to claim 1, wherein the first common electrode is spaced apart from the two parts of the pixel electrode by a same distance.

3. The array substrate according to claim 1, wherein a gate insulating layer is formed between the gate line and the data line, and the pixel electrode and the first common electrode are formed directly on the gate insulating layer.

4. The array substrate according to claim 1, wherein the pixel electrode, the first common electrode and the second common electrode are formed of a transparent conductive material.

5. The array substrate according to claim 1, wherein the second opening has wider width than the opening portion such that the second opening overlaps the two parts of the pixel electrode.

6. The array substrate according to claim 1, wherein the two parts of the pixel electrode are electrically connected to each other through a pixel connecting pattern, which is formed on a same layer as the pixel electrode.

7. The array substrate according to claim 1, wherein the pixel electrode and the second common electrode form a storage capacitor with the passivation layer interposed therebetween.

8. The array substrate according to claim 1, wherein the pixel electrode, the first common electrode, the first openings and the second opening are bent and symmetric with respect to a supposed line crossing a central portion of the pixel region and parallel to the gate line.

9. The array substrate according to claim 8, wherein the data line is bent and symmetric with respect to the supposed line crossing the central portion of the pixel region and parallel to the gate line.

10. A method of manufacturing an array substrate for a wide viewing angle liquid crystal display device, comprising:
   forming a gate line on a substrate;
   forming a data line crossing the gate line to define a pixel region;
   forming a thin film transistor electrically connected to the gate and data lines;
   forming a pixel electrode in the pixel region and connected to a drain electrode of the thin film transistor, the pixel electrode including two parts and an opening portion therebetween;
   forming a first common electrode in the opening portion, the first common electrode disposed on a same layer as the pixel electrode;
   forming a passivation layer on the pixel electrode and the first common electrode, the passivation layer having a common contact hole exposing the first common electrode; and
   forming a second common electrode on the passivation layer and connected to the first common electrode through the common contact hole, the second common electrode including first openings corresponding to the pixel electrode and a second opening corresponding to the opening portion.

11. The method according to claim 10, wherein the first common electrode is spaced apart from the two parts of the pixel electrode by a same distance.

12. The method according to claim 10, wherein the second opening has wider width than the opening portion such that the second opening overlaps the two parts of the pixel electrode.

* * * * *